United States Patent
Rosati et al.

(10) Patent No.: US 10,450,024 B2
(45) Date of Patent: Oct. 22, 2019

(54) BICYCLE CONTROL LEVER AND METHOD FOR MANUFACTURING IT

(71) Applicant: Campagnolo S.r.l., Vicenza (IT)

(72) Inventors: Stefano Rosati, Mira Venezia (IT); Flavio Fusari, Vicenza (IT)

(73) Assignee: CAMPAGNOLO S.R.L., Vicenza (IT)

(*) Notice: Subject to any disclaimer, the term of this patent is extended or adjusted under 35 U.S.C. 154(b) by 149 days.

(21) Appl. No.: 14/873,971

(22) Filed: Oct. 2, 2015

(65) Prior Publication Data

US 2016/0096570 A1 Apr. 7, 2016

(30) Foreign Application Priority Data

Oct. 3, 2014 (IT) .......................... MI2014A001740

(51) Int. Cl.
| | | |
|---|---|---|
| *B62J 6/00* | (2006.01) | |
| *B62M 25/04* | (2006.01) | |
| *B62J 6/18* | (2006.01) | |
| *B62K 19/16* | (2006.01) | |
| *B62K 23/06* | (2006.01) | |
| *B62J 99/00* | (2009.01) | |

(52) U.S. Cl.
CPC ................. *B62J 6/00* (2013.01); *B62J 6/001* (2013.01); *B62J 6/18* (2013.01); *B62K 19/16* (2013.01); *B62K 23/06* (2013.01); *B62M 25/04* (2013.01); *B62J 2099/004* (2013.01)

(58) Field of Classification Search
CPC ....... B62J 6/00; B62J 6/18; B62J 6/001; B62J 2300/004; B62J 2099/004; B62K 23/06; B62K 19/16; B62M 25/04
See application file for complete search history.

(56) References Cited

U.S. PATENT DOCUMENTS

| | | | |
|---|---|---|---|
| 5,446,628 A | 8/1995 | Blom | |
| 6,170,356 B1 * | 1/2001 | Campagnolo | B62K 23/06 74/519 |
| 6,931,958 B2 | 8/2005 | Takeda | |
| 7,049,944 B2 | 5/2006 | Uno | |
| 7,363,873 B2 | 4/2008 | Iteya | |
| 7,703,350 B2 | 4/2010 | Fujii | |
| 7,841,255 B2 | 11/2010 | Fujii | |
| 8,035,046 B2 | 10/2011 | Perini | |
| 2001/0053724 A1 | 12/2001 | Campagnolo | |
| 2004/0190302 A1 | 9/2004 | Mascardi et al. | |
| 2006/0007693 A1 | 1/2006 | Grepper | |

(Continued)

FOREIGN PATENT DOCUMENTS

| | | |
|---|---|---|
| CN | 1485245 A | 3/2004 |
| CN | 1626403 A | 6/2005 |

(Continued)

OTHER PUBLICATIONS

Shell_Definition of Shell by Merriam-Webster, accessed at https://www.merriam-webster.com/dictionary/shell on Apr. 19, 2019 (Year: 2019).*

(Continued)

*Primary Examiner* — Erin Kryukova
(74) *Attorney, Agent, or Firm* — Volpe and Koenig, P.C.

(57) ABSTRACT

A bicycle control lever includes a luminous indicator arranged between an inner half-shell and an outer half-shell, and the outer half-shell has at least one transparent region at the luminous indicator.

14 Claims, 5 Drawing Sheets

(56) References Cited

U.S. PATENT DOCUMENTS

| | | | |
|---|---|---|---|
| 2007/0014120 A1 | 1/2007 | Kitamura | |
| 2007/0193387 A1 | 8/2007 | Nakano | |
| 2007/0193497 A1* | 8/2007 | Iteya | B62J 6/00 116/28.1 |
| 2007/0235308 A1 | 10/2007 | Sharrah | |
| 2008/0072697 A1 | 3/2008 | Fujii | |
| 2008/0180233 A1* | 7/2008 | Miglioranza | A45F 5/102 340/432 |
| 2008/0210043 A1* | 9/2008 | De Perini | B62K 23/02 74/502.2 |
| 2009/0031841 A1 | 2/2009 | Tetsuka | |
| 2010/0067245 A1* | 3/2010 | Fan | B62J 6/00 362/474 |
| 2010/0199798 A1* | 8/2010 | Uno | B60T 7/102 74/491 |
| 2012/0255390 A1 | 10/2012 | Warren et al. | |
| 2014/0352478 A1* | 12/2014 | Gao | B62L 3/02 74/488 |
| 2015/0284049 A1* | 10/2015 | Shipman | B62M 25/08 74/473.12 |

FOREIGN PATENT DOCUMENTS

| | | |
|---|---|---|
| CN | 101012000 A | 8/2007 |
| CN | 101200211 A | 6/2008 |
| CN | 202243802 U | 5/2012 |
| CN | 202806571 U | 3/2013 |
| DE | 102009005777 A1 | 8/2010 |
| EP | 1264765 A1 | 12/2002 |
| EP | 1820724 A2 | 8/2007 |
| EP | 1964763 A1 | 9/2008 |
| EP | 2020371 A1 | 2/2009 |
| JP | 59-136136 | 9/1984 |
| JP | 63-012124 | 1/1988 |
| JP | 01-150185 | 10/1989 |
| JP | 2009029345 A | 2/2009 |
| JP | 3166295 U | 2/2011 |
| JP | 2011-230665 A | 11/2011 |
| JP | 2013006466 A | 1/2013 |
| TW | I301456 B | 10/2008 |
| TW | M377037 U | 3/2010 |
| TW | M401611 U | 4/2011 |
| TW | M427342 U | 4/2012 |
| TW | M454967 U | 6/2013 |

OTHER PUBLICATIONS

European Search Report for Application No. EP15191077.5-1755, dated Dec. 10, 2015.
Italian Search Report and Written Opinion in Italian Application No. IT MI2014A001736, dated May 4, 2015 with English translation.
Italian Search Report and Written Opinion in Italian Application No. IT MI2014A001740, dated Jan. 7, 2015 with English translation.
Italian Search Report and Written Opinion in Italian Application No. IT MI2014A001739, dated May 11, 2015 with English translation.
European Search Report for Application No. 15186833.8, dated May 24, 2017.
Chinese Office Action dated Feb. 1, 2019, in corresponding Chinese Application No. 201510645203.0.
Taiwanese Office Action dated Oct. 22, 2018, in corresponding Taiwanese Application No. 104131886, and English Translation.
Japanese Office Action dated Nov. 6, 2018, in corresponding Japanese Application No. 2015-196426.
Japanese Office Action dated Nov. 13, 2018, in corresponding Japanese Application No. 2015-196431.
Fukagawa Keizai Shinbun, Japan, Kabushikikaisha Saramawashi—Datto-Komu, May 7, 2015, URL: https://fukagawa.keizai.biz/headline/145/.
Chinese Office Action dated Jun. 3, 2019, in Chinese Application No. 201510645055.2.
Japanese Office Action dated Jul. 30, 2019, in Japanese Application No. 2015-196427.

* cited by examiner

BICYCLE CONTROL LEVER AND METHOD FOR MANUFACTURING IT

CROSS REFERENCE TO RELATED APPLICATIONS

This application claims the benefit of Italian Application No. MI2014A001740, which was filed on Oct. 3, 2014, and is incorporated herein by reference as if fully set forth.

FIELD OF INVENTION

The present invention relates, in general, to a bicycle control lever for imparting at least one mechanical command or an electrical-electronic command to at least one equipment of the bicycle, such as a brake, an electromechanical derailleur or a cyclecomputer.

BACKGROUND

In particular, the present invention relates to a bicycle control lever provided with luminous indicator means irremovably associated with the control lever.

The invention also relates to a method for manufacturing a bicycle control lever provided with luminous indicator means irremovably associated with the control lever.

Known bicycle control devices comprise one or more manual actuation members, of the lever type, namely rigid bodies actuated with a rotary movement about a pivot or fulcrum, or of the button type, namely actuated with a linear movement, said manual actuation members being actuatable with one finger or with plural fingers. Typically, the manual actuation members are supported by a body suitable for fixing at a grip portion of the handlebars.

In the case of control devices for imparting at least one electrical-electronic command, the manual actuation members typically act on respective electric switches, of the microswitch type, each including a deformable dome-shaped diaphragm. In order to switch the switches, an actuation head fixed to the respective manual actuation member faces the deformable diaphragm in the rest condition of the manual actuation member, and acts by pushing on the deformable diaphragm in the actuation condition of the manual actuation member.

In greater detail, a bicycle typically comprises a rear brake associated with the rear wheel and/or a front brake associated with the front wheel, which are controlled by suitable control devices. Known brake control devices typically comprise a handlebars-fixing-body and a brake lever pivoted to the body to actuate the brake by the traction of an inextensible cable, usually sheathed (Bowden cable), when it is pulled towards the handlebars.

A motion transmission system in a bicycle comprises a chain extending between toothed wheels associated with the axle of the pedal cranks and with the hub of the rear wheel. When there is more than one toothed wheel at at least one of the axle of the pedal cranks and the hub of the rear wheel, and the motion transmission system is therefore provided with a gearshift, a front derailleur and/or a rear derailleur is provided for.

A control device of the front derailleur and a control device of the rear derailleur—or only one of the two in the case of simpler gearshifts—are mounted so as to be easily manoeuvred by the cyclist, usually on the handlebars, close to the handgrips thereof where the brake lever for controlling the brake of the front and rear wheel, respectively, is also located.

Control devices that allow driving both a derailleur in the two directions and a brake are commonly called integrated controls.

Such integrated controls comprise, in particular, a brake lever, a first gearshift lever for example arranged behind the brake lever, and a second gearshift lever for example arranged on a proximal surface of bicycle-fixing-body of the control device, to command an electromechanical derailleur in the two directions.

Hereinbelow and in the subsequent claims, the terms: outer, inner, upper, lower, side, distal and proximal will be used to indicate geometric and structural elements of the control device and of the components comprising it that are thus oriented in the mounted and rest condition thereof and of bicycle handlebars. In particular, the terms distal and proximal are used with reference to the centre of the handlebars. The terms outer and inner are used with reference to the centre of a control device to which the lever is applied, so that the outer side is that most in view, and the inner side is that most hidden, in the mounted condition of the lever.

By convention, the control device of the front derailleur and the brake lever of the front wheel are located close to the left handgrip, and vice-versa the control device of the rear derailleur and the brake lever of the rear wheel are located close to the right handgrip.

Control devices are also known wherein a single lever is capable of rotating about two or three axes to perform two or three functions among the brake control lever function, the upward gearshifting control lever function and the downward gearshifting control lever function.

Specialised racing handlebars are also known, which have two or four bars or ends facing prominently forwards, which allow the cyclist to maintain a position of the torso greatly inclined forwards, which is aerodynamically efficient. With these handlebars, specific control devices are also used, both for the brakes and for the gearshift; these devices are commonly called bar-end since they are indeed housed at the ends of the handlebars, so that the cyclist can actuate them easily without having to change his/her position.

In the case of an electronically servo-assisted gearshift, or in short electronic gearshift, one or two control levers can be used to impart a command to increase the gear ratio and a command to reduce the gear ratio, control electronics that suitably drive the front and/or rear derailleur to actuate each command being provided for.

Moreover, in the case of an electronically servo-assisted gearshift, each derailleur comprises a chain guide element, also called cage, movable to displace the chain among toothed wheels in order to change the gear ratio, and an electromechanical actuator to move the chain guide element. The actuator in turn typically comprises a motor, typically an electric motor, coupled with the chain guide element through a linkage such as an articulated parallelogram, a rack system or a worm screw system, as well as a sensor of the position, speed and/or acceleration of the rotor or of any mobile part downstream of the rotor, down to the chain guide element itself. It is worthwhile noting that slightly different terminology from that used in this context is also in use.

In the case of a mechanical gearshift, the motor is absent and the linkage of the derailleurs is controlled through the traction of an inextensible cable, usually sheathed (Bowden cable), when the gearshifting control lever is actuated.

The present invention applies to all the types of control levers described above, and in principle to any lever suitable for imparting commands to equipments of the bicycle, such as a brake, a derailleur, a so-called cyclecomputer.

In bicycles there may also be control electronics that monitors the state of various sensors of one or more variables such as the travel speed, the cadence of rotation of the pedal cranks, the torque applied to the pedal cranks, the slope of the travel terrain, the heart rate of the cyclist and similar.

In the case of an electronic gearshift, the control electronics can also change the gear ratio automatically based on such detected variables, or aid the manual control of the electronic gearshift.

Luminous indicator devices for a bicycle are also known, for example presence luminous indicators and/or direction luminous indicators.

Such luminous indicator devices typically comprise a presence and/or direction indicator fixed to the front of the bicycle, a presence and/or direction luminous indicator fixed to the back of the bicycle, and on/off means of the front and rear luminous indicators, typically arranged at the handlebars of the bicycle and in electrical connection, via cable or wirelessly, with the front and rear luminous indicators.

JP 3166295 U discloses a control lever of a bicycle brake having luminous indicator means for indicating the position of the bicycle to other vehicles or to pedestrians. The luminous indicator means are preferably fixed directly on the surface of the brake lever, in one embodiment they are fixed in a groove of the brake lever with snap means. The luminous indicator means comprise a substrate with at least one luminous emission element covered by a transparent cover. The brake lever comprises a power supply source of the luminous indicator means, or a power supply source of the luminous indicator means is provided on the body of the bicycle. A switch is provided for between the power supply source and the luminous indicator means. A controller in the power supply source controls the luminous emission pattern.

More specifically, the luminous indicator means are arranged along a part of the distal surface of the brake lever, which in the rest or centralised position of the handlebars faces forwards on the bicycle. A conductor that connects the luminous indicator means to the power supply source is shown through a hole through a portion of the lever.

Starting from such a prior art, the technical problem at the basis of the invention is to provide a bicycle control lever provided with luminous indicator means irremovably associated with the control lever itself in a more practical and effective manner.

SUMMARY OF THE INVENTION

The present invention relates to a bicycle control lever that includes a luminous indicator that is positioned between an inner half-shell and an outer half-shell and at least one region of the outer half-shell at the luminous indicator is transparent.

BRIEF DESCRIPTION OF THE DRAWINGS

The present invention will become clearer from the following detailed description of some embodiments thereof, made hereinafter for indicating and not limiting purposes with reference to the attached drawings. The different features illustrated and described with reference to the individual configurations can be combined with each other as desired. In the drawings.

In the following description, in order to illustrate the figures, identical or similar reference numerals are used to indicate constructive elements with the same or analogous function.

DETAILED DESCRIPTION OF THE PREFERRED EMBODIMENTS

The bicycle control lever of the present invention includes a luminous indicator that is positioned between an inner half-shell and an outer half-shell and at least one region of the outer half-shell at the luminous indicator is transparent.

Preferably, the inner half-shell can at least partially overlap the outer half-shell.

More preferably, the inner half-shell and the outer half-shell are each channel-shaped, the inner half-shell being housed within the channel of the outer half-shell.

Preferably, the control lever comprises power supply means of said luminous indicator means.

In an alternative embodiment, the control lever comprises a connector with power supply means of said luminous indicator means arranged elsewhere on the bicycle.

Preferably, said inner half-shell comprises a first portion and a second portion, which have respective overlapped areas.

Making the inner half-shell in two parts advantageously allows a cable or a lamella for supplying/controlling the luminous indicator means to come out from the gap between the outer half-shell and the inner half-shell.

Preferably, the control lever further comprises electrical/data connection means of said luminous indicator means to power supply means and/or to driving means of the luminous indicator means, said electrical/data connection means comprising an end section extending between and protruding from said overlapped areas.

Preferably, the control lever further comprises an electronic board in communication with control electronics of the bicycle and with the luminous indicator means.

The communication between the electronic board and the control electronics of the bicycle can be of the wireless or wired type.

Preferably, the control lever further comprises driving means of the luminous indicator means, and a transceiver module for the communication of the driving means of the luminous indicator means with control electronics of the bicycle.

Preferably, said transparent region of the outer half-shell is formed as one piece with the rest of the outer half-shell.

Alternatively, said transparent region of the outer half-shell comprises an opening formed in the outer half-shell, and a cover made of transparent material for closing said opening.

Said transparent region can consists of the totality of the outer half-shell.

In embodiments, said transparent region is arranged in a position on the control lever that faces towards the cyclist in at least one of the actuation condition of the control lever and the rest condition of the control lever.

In this case, the luminous indicator means are advantageously configured to provide the cyclist with a visual indication regarding one or more variables detected by control electronics associated with the bicycle, such as for example the travel speed, the slope of the travel terrain, the current gear ratio, the heart rate of the cyclist, and similar.

Preferably, the transparent region is in this case positioned at a proximal side wall of the outer half-shell.

Alternatively or in addition, said transparent region is arranged in a position on the control lever that is frontal or distal with respect to the cyclist in at least one of the actuation condition of the control lever and the rest condition of the control lever.

In this case the luminous indicator means are advantageously configured to indicate to third parties, for example to a pedestrian or to the driver of another vehicle, the presence of the cyclist and/or his wish to change the travel direction.

The control lever can be one of the various levers described above, but preferably the control lever is a control lever of a brake. Alternatively, the control lever is a control lever both of a brake and of a derailleur, in at least one (upward and/or downward) gearshifting direction.

In embodiments, said luminous indicator means comprise a support body and a plurality of lighting elements arranged on the support body.

Preferably, said plurality of lighting elements comprises a plurality of LEDs of the white light- or RGB type.

In other embodiments, said luminous indicator means comprise an OLED.

Preferably said outer half-shell and said inner half-shell are made of composite material comprising a matrix of polymeric material and structural fibres.

The polymeric material can be of the thermosetting or thermoplastic type and the structural fibres are preferably selected from the group consisting of carbon fibres, glass fibres, aramid fibres, ceramic fibres, boron fibres, and combinations thereof. Carbon fibres are particularly preferred.

In one aspect, the invention relates to a method for manufacturing a bicycle control lever, comprising the steps of:
  providing an outer half-shell, wherein at least one region of the outer half-shell is transparent;
  inserting luminous indicator means in the outer half-shell, the luminous indicator means being positioned at the transparent region of the outer half-shell; and
  irremovably associating an inner half-shell with the outer half-shell by at least partially overlapping it to the outer half-shell, the luminous indicator means being at least partially arranged between the outer half-shell and the inner half-shell.

Preferably, said inner half-shell comprises a first portion and a second portion, and said step of associating the inner half-shell with the outer half-shell comprises the steps of:
  associating one of said first portion and said second portion of the inner half-shell with the outer half-shell so that the luminous indicator means are at least partially arranged between said inner half-shell and said outer half-shell; and
  associating the other of said first portion and said second portion of the inner half-shell with the outer half-shell, so that said first portion and said second portion have respective overlapping areas, and so that an end section of electrical/data connection means of said luminous indicator means to power supply means and/or to driving means of the luminous indicator means extends between and protrudes from said overlapped areas.

Preferably, said step of associating said first and said second portion of the inner half-shell with the outer half-shell takes place through co-moulding (or lamination).

With reference to FIGS. 1 to 4, these illustrate a bicycle control lever, in particular a brake lever globally indicated with reference numeral 10, according to a first embodiment of the present invention.

Figure 1:
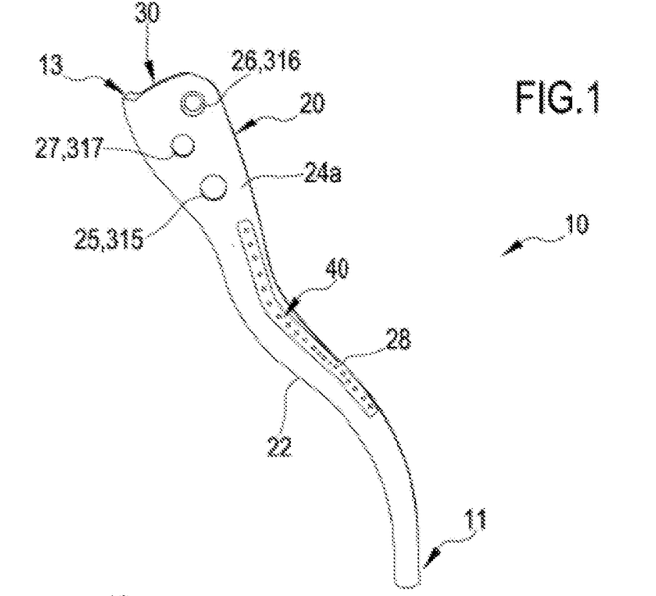
FIG. 1 is a side view of a bicycle control lever according to a first embodiment of the invention.
Figure 2:
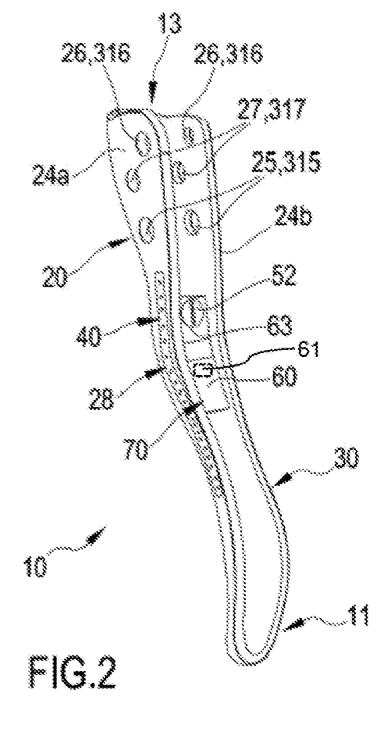
FIG. 2 is a rear perspective view of the control lever of FIG. 1.
Figure 3:
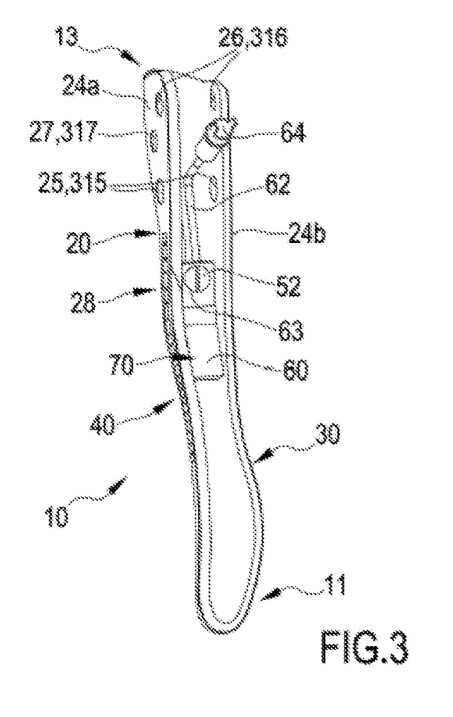
FIG. 3 is a view analogous to that of FIG. 2, although in a slightly different perspective, that shows another embodiment of the present invention.

The lever 10 shown is a lever of a right control device, i.e. intended to be associated with the right end of bicycle handlebars, to be actuated by the cyclist with the right hand. A lever for a control device intended to be associated with the left end of the handlebars will substantially be its mirror image.

Although in the rest of the present description reference will always be made to a brake lever, what is described with reference to the brake lever also applies for any other control lever of the bicycle, for example an upward gearshift lever of the front or rear derailleur, or a downward gearshift lever of the front or rear derailleur, or another control lever of a gearshift or of a cyclecomputer.

The brake lever 10 comprises an outer half-shell 20, an inner half-shell 30 and luminous indicator means 40 arranged between the inner half-shell 20 and the outer half-shell 30.

Figure 4:
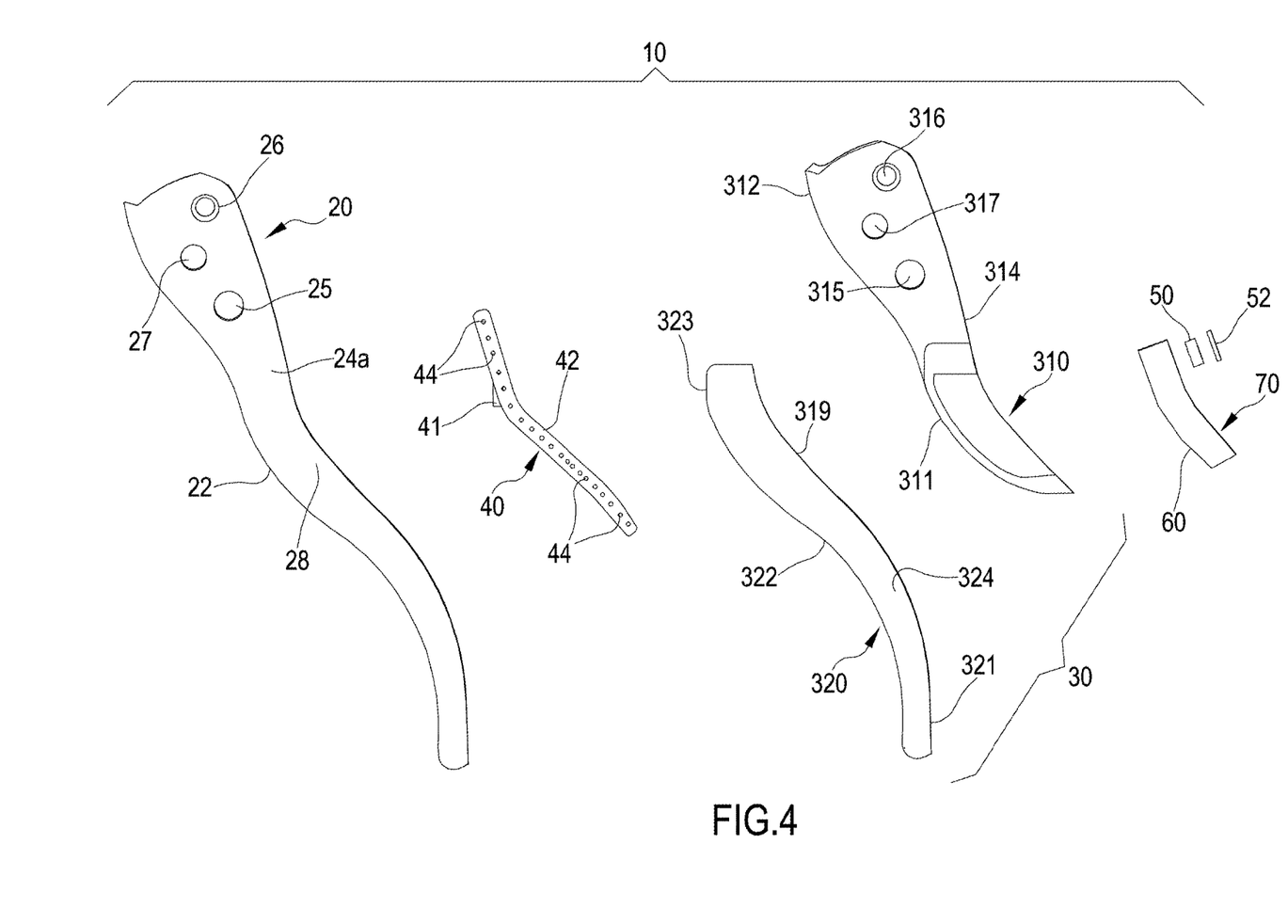
FIG. 4 is an exploded side view that shows the different components of the control lever of FIG. 1.

More specifically, the outer half-shell 20 is substantially configured like a channel and comprises a bottom wall 22, which in the mounted configuration is distal, facing in the travel direction, and two side walls 24a, 24b all preferably having a curvilinear progression, in order to allow an ergonomic grip for the cyclist.

Preferably, each side wall 24a, 24b has an increasing width going from a lower end portion 11 to an upper end portion 13 of the brake lever 10. It is however manifest that the specific shape of the control lever 10 can be modified as desired.

In a per se known manner, the side walls 24a, 24b, at the upper end portion 13 of the brake lever 10, have a first pair of facing holes 25 for the engagement of an articulation pin (not shown) to a support body of the brake lever 10 (also not shown), suitable for being mounted on the handlebars of the bicycle, also called bicycle-fixing-body. The side walls 24a, 24b also have a second pair of facing holes 26 for the engagement of a second pin (not shown) for anchoring a brake cable (not shown). Furthermore, the side walls 24a, 24b have a third pair of facing holes 27 for the engagement of a release mechanism of the brake cable (not shown), suitable for interacting with the bicycle-fixing-body to tension or de-tension the brake cable.

The outer half-shell 20 and the inner half-shell 30 are preferably made of composite material comprising a matrix of polymeric material and structural fibres. The polymeric material can be of the thermosetting or thermoplastic type, and the structural fibres are preferably selected from the group consisting of carbon fibres, glass fibres, aramid fibres, ceramic fibres, boron fibres, and combinations thereof. Carbon fibres are particularly preferred. The two materials of the outer and inner half-shells 20 and 30 do not necessarily have to be the same.

Moreover, the outer half-shell 20 has at least one transparent region 28, which acts as a protective element for the luminous indicator means 40, as well as possibly as means for diffusing the light emitted by the luminous indicator means 40.

Preferably, the transparent region 28 of the outer half-shell 20 is formed at the proximal side wall 24a of the outer half-shell 20, which, in an assembled condition of the brake lever 10, faces towards the centre of the handlebars and thus faces towards the cyclist, in at least one of the rest condition of the lever 10 and its actuation condition. This is in order to make the luminous indicator means 40 immediately visible by the cyclist, as explained better hereinafter.

The transparent region 28 can be formed as one piece with the outer half-shell 20 or as a separate component that is subsequently mounted on the outer half-shell 20, for example at an opening formed in the outer half-shell 20. Moreover, the scope of protection of the present invention encompasses a control lever 10 having an entirely transparent outer half-shell 20, as shown.

With particular reference to FIG. 4, the inner half-shell 30 has also a substantially channel-shaped shape corresponding to that of the outer half-shell 20. More specifically, the size of the inner half-shell 30 is slightly smaller than that of the outer half-shell 20, so as to allow the inner and outer half-shells 30 and 20 to be overlapped, in this way obtaining a laminated control lever 10.

In particular, the inner half-shell 30 comprises a first portion 310, suitable for inserting, during manufacturing of the brake lever 10, at an upper half of the outer half-shell 20 and for totally overlapping the upper half of the outer half-shell 20, and a second portion 320 suitable for inserting, during manufacturing of the brake lever 10, at a lower half of the outer half-shell 20 and for totally overlapping the lower half of the outer half-shell 20. When inserted inside the outer half-shell 20, the first and the second portions 310, 320 of the inner half-shell 30 have overlapping areas, 311, 319 respectively, the function of which will become clearer hereinbelow.

The contact surface between the first and the second portion 310, 320 of the inner half-shell 30 is preferably—but not necessarily—made on an oblique plane, so as to be greater than if it were on a plane perpendicular to the lever.

In particular, the first portion 310 of the inner half-shell 30 comprises a bottom wall 312 and two side walls 314, having a shape substantially corresponding to that of the bottom wall 22 and of the side walls 24a, 24b of the outer half-shell 20. The side walls 314 therefore have: a first pair of facing holes 315, each coaxial, in the mounted condition, to a respective hole 25 of the first pair of holes 25 of the outer half-shell 20; a second pair of facing holes 316, each coaxial, in the mounted condition, to a respective hole 26 of the second pair of holes 26 of the outer half-shell 20; and a third pair of facing holes 317, each coaxial, in the mounted condition, to a respective hole 27 of the pair of holes 27 of the outer half-shell 20. The first pair of holes 315, the second pair of holes 316 and the third pair of holes 317 of the first portion 310 of the inner half-shell 30 perform functions totally analogous to those carried out by the pairs of holes 25, 26 and 27 of the outer half-shell 20.

The second portion 320 of the inner half-shell 30 comprises a bottom wall 322 and two side walls 324. Preferably, the side walls 324 have increasing width going from a lower end portion 321 to an upper end portion 323 of the second portion 320 of the inner half-shell 30.

As stated earlier, the brake lever 10 further comprises luminous indicator means 40. In the embodiment of FIGS. 1 to 4, the luminous indicator means 40 comprise a support body 42 for at least one and preferably a plurality of lighting elements 44, preferably of the Light-Emitting Diode type (LED).

Thanks to their positioning at the side wall 24a of the outer half-shell 20 facing towards the cyclist, or proximal, as stated above, the luminous indicator means 40 can advantageously be used to provide the cyclist with a visual indication on one or more variables detected by on-board control electronics (not shown), such as, for example, the travel speed, the heart rate of the cyclist, the gearshifting sequence, the slope of the travel terrain, and similar.

The LED lighting elements 44 are of the white light type or, preferably, multi-colour LED, for example RGB (Red-Green-Blue), lighting elements.

The support body 42 of the lighting elements 44 has a flat, elongated shape with curvilinear progression, which substantially reproduces the curvilinear progression of the side walls 24a, 24b of the outer half-shell 20 and of the side walls 314, 324 of the inner half-shell 30 in the area of the transparent region 28.

The luminous indicator means 40 further comprise a metallic electrical connection lamella 41 of the luminous indicator means 40 to a power supply source 50, such as for example a battery, and/or for communicating data to/from a Printed Circuit Board 60 for driving the LEDs 44.

Figures 5, 6, 7:
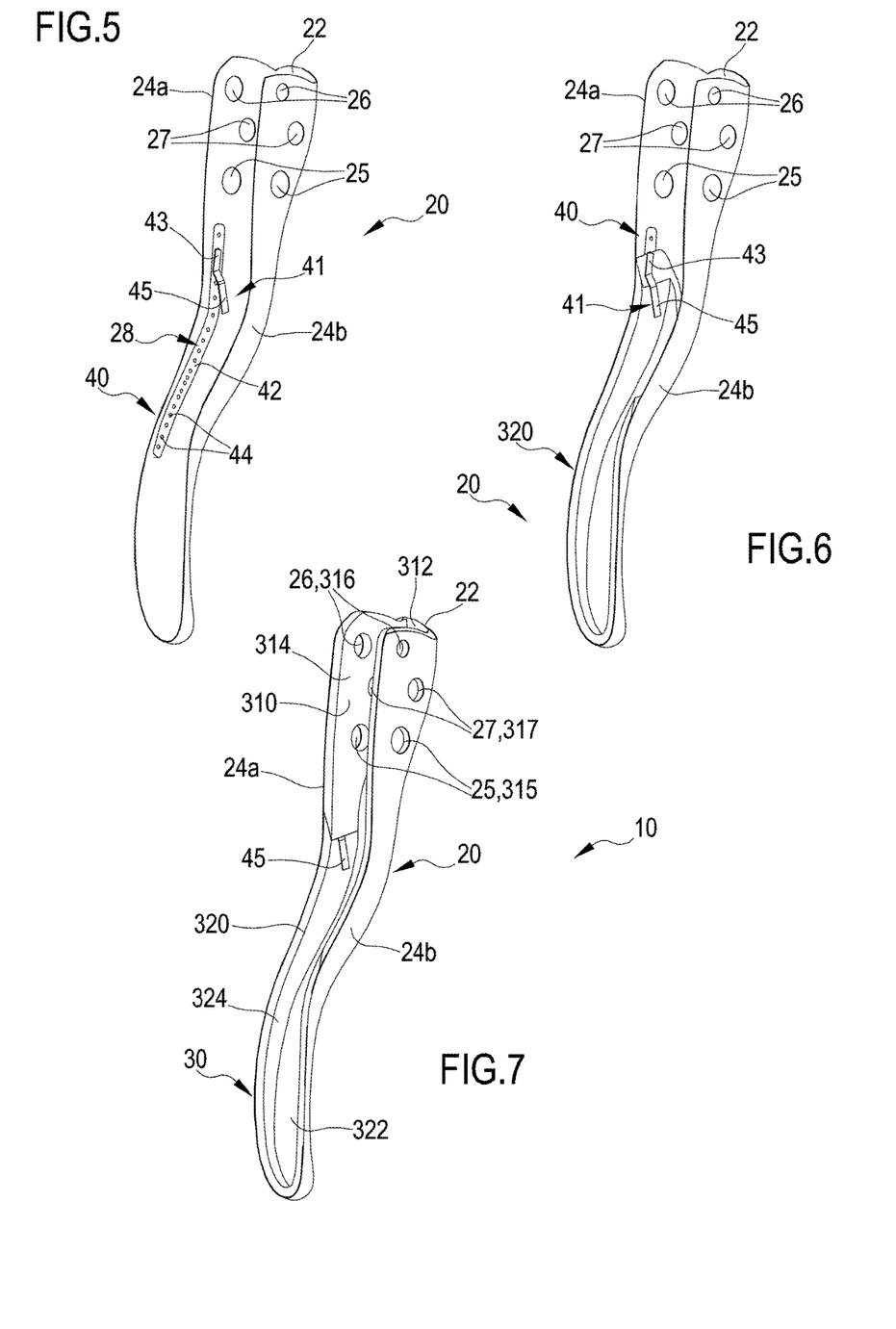
FIGS. 5 to 7 show successive steps of a method for manufacturing the control lever of FIG. 1.

In particular, and as shown in greater detail in FIGS. 5 to 7, the metallic lamella 41 comprises a first section 43 for fixing to the support body 42 and a second section 45 that extends cantilevered from the first section 43, for actually connecting to the power supply source 50.

The power supply source can be a battery 50 of the primary or rechargeable type, preferably of the button type.

The circuit board 60 is preferably housed in a containment body 70 (FIGS. 2 to 4), preferably tight. Alternatively or in addition, the circuit board 60 can be co-moulded with a film of plastic that makes it waterproof and protects it from dust.

Preferably, in the containment body 70 that houses the circuit board 60 a seat 63 is formed to house the battery 50, the latter being fixed in position in the respective housing seat 63 through a closing cover 52.

The circuit board 60 is suitable for communicating with the on-board control electronics to drive the lighting of the LED lighting elements 44 as a function, for example, of changes in the variables detected by the control electronics.

By way of an example, the circuit board 60 can control the switching on of a certain number of LED lighting elements 44 to indicate, in a roughly proportional manner, the current speed, gear ratio or heart rate, etc., and/or can control the change of colour and/or a flashing operation of the LED lighting elements 44, as well as the flashing frequency thereof.

The communication between the circuit board 60 and the control electronics of the bicycle can take place wirelessly or in a wired manner. In the first case (FIG. 2) a transceiver module 61 is provided for, while in the second case, and as shown in detail in FIG. 3, an electric cable 62 is provided for, preferably provided with a connector 64. In this case, the electric cable 62 can also be used to supply power to the LED lighting elements 44, in which case the power supply source 50 is omitted.

Again with reference to FIGS. 5 to 7, the method for manufacturing the brake lever 10 described above and illustrated in FIGS. 1 to 4 is described.

First of all, the outer half-shell 20 of the brake lever 10 is provided and, thereafter, the support body 42 of the LED lighting elements 44 is inserted inside its channel (FIG. 5), with the emitting surface facing towards the outside (distal side) of the control lever 10. In particular, the support body 42 is positioned at the transparent region 28 of the outer half-shell 20, which, as stated earlier, in this embodiment is formed in the proximal side wall 24a of the outer half-shell 20 facing, in the assembled condition of the brake lever 10, towards the cyclist. The section 45 of the metallic blade 41 is allowed to protrude into the channel of the outer half-shell 20.

Then (FIG. 6), the second portion 320 of the inner half-shell 30 is associated with the outer half-shell 20, overlapping it, at the lower half of the outer half-shell 20. After such an operation, part of the support body 42 of the LED lighting elements 44 is arranged between the outer half-shell 20 and the second portion 320 of the inner half-shell 30, sandwiched therebetween. Moreover, as can be seen in FIG. 6, the part of the support body 42 to which the metallic lamella 41 for the electrical connection of the luminous indicator means 40 is fixed is uncovered. The section 45 of the metallic lamella 41 is again allowed to protrude into the channel of the outer half-shell 20.

Thereafter (FIG. 7), the first portion 310 of the inner half-shell 30 is associated with the inside of the outer half-shell 20 in overlapping it, at the upper half of the outer half-shell 20. Thereafter, the first portion 310 and the second portion 320 of the inner half-shell 30 are overlapped at the respective overlapping areas 311 and 319, the support body 42 is entirely arranged between the outer half-shell 20 and the inner half-shell 30, sandwiched therebetween, and the second cantilevered section 45 of the metallic lamella 41 comes out into the channel of the inner half-shell 30 and can thus be electrically connected to the power supply means 50 and/or to the circuit board 60 of the brake lever 10, for example being connected to the containment body 70.

Preferably, the coupling between the inner half-shell 30 and the outer half-shell 20 takes place by co-moulding.

As far as the inner half-shell 20 and the outer half-shell 30 are concerned, they can each be formed during the manufacturing of the lever 10 itself.

For example, layers of composite material are laid over one another until the desired thickness of the outer half-shell 20 is formed; thereafter, the luminous indicator means 40 are arranged as described; thereafter, more layers of composite material are laid over one another to form the desired thickness of the second portion 320 of the inner half-shell 30 with the provisions indicated above regarding the lamella 45; thereafter, more layers of composite material are laid over one another until the desired thickness of the first portion 310 of the inner half-shell 30 is formed.

The layers of reinforcing fibre may or may not be pre-impregnated with the thermoplastic or thermosetting material. Therein, the length and orientation of the reinforcing fibre will be selected in a suitable manner by those skilled in the art; the reinforcing fibre may or may not be woven.

If the layers are not preimpregnated, the material of thermoplastic or thermosetting matrix is then inserted within the mould and the mould is closed, or injected in the already closed mould.

Then, the moulding chamber is subjected to a suitable temperature and/or pressure profile for the cross-linking or setting of the thermoplastic or thermosetting material.

Finally, the moulded control lever 10 is extracted from the mould.

Of course, without departing from the scope of protection of the present invention, it is possible to provide for other modes of coupling between the inner half-shell 30 and the outer half-shell 20, for example gluing, and whatever other mode, suitable for ensuring the sandwiching of the luminous indicator means 40 between the outer half-shell 20 and the inner half-shell 30, and the irremovable holding of the luminous indicator means 40.

With reference to FIGS. 8 to 11, a bicycle control lever is illustrated therein, in particular a brake lever globally indicated with reference numeral 110, according to another embodiment of the present invention. The analogous parts are indicated with corresponding reference numerals, with a further number "1" before (namely increased by 100 or 1000, respectively), and the lever 110 of this embodiment is described only in how it differs from the embodiment described above with reference to FIGS. 1 to 7.

Figures 8, 9:
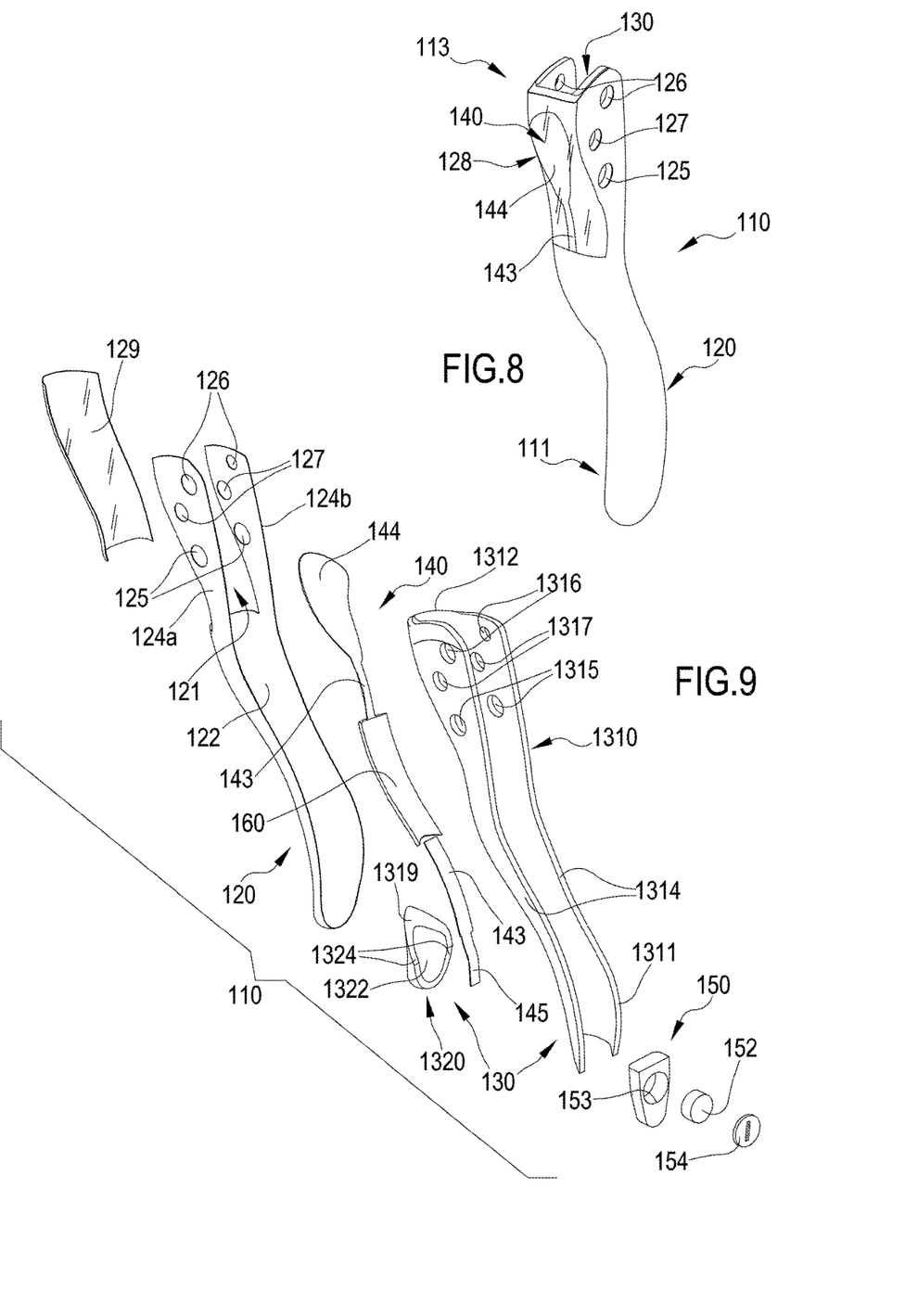
FIG. 8 is a front perspective view of a bicycle control lever according to another embodiment of the present invention.
FIG. 9 is an exploded perspective view that shows the different components of the control lever of FIG. 8.

As can be seen more clearly in FIG. 9, the outer half-shell 120 has a transparent region 128, which, in the illustrated embodiment, comprises an opening 121 closed by a cover 129.

The cover 129 is preferably made of glass fibre or other transparent material, and acts as a protective element of the luminous indicator means 140, as well as possibly as diffusion means of the light emitted by the luminous indicator means 140.

Alternatively, the transparent region 128 can be formed as one piece with the outer half-shell 120. Moreover, the scope of protection of the present invention encompasses a control lever having an entirely transparent outer half-shell.

The transparent region 128 of the outer half-shell 120 is formed at the front part of the outer half-shell 120, which, in an assembled condition of the brake lever 110, faces in the direction of motion of the bicycle, distal with respect to the cyclist. As a result, the light emitted by the luminous indicator means 140 is visible to third parties, for example a pedestrian or the driver of another means of transportation.

Preferably, the transparent region 128 of the outer half-shell 120 is formed at the upper end portion 113 of the brake lever 110.

It should be observed that, differently from the outer half-shell 120, the bottom wall 1312 of the inner half-shell 130 is solid, i.e. it does not have any opening at the opening 129 formed in the outer half-shell 120.

The inner half-shell 130 of this embodiment also comprises a first portion 1310, suitable for inserting, during manufacturing of the brake lever 110, at an upper half of the outer half-shell 120, and for totally overlapping the upper half of the outer half-shell 120, and a second portion 1320 suitable for inserting, during manufacturing of the brake lever 110, at a lower half of the outer half-shell 120, and for totally overlapping the lower half of the outer half-shell 120. When inserted inside the outer half-shell 120, the first and the second portions 1310, 1320 of the inner half-shell 130 have areas overlapping one another 1311, 1319, respectively.

In this case, the first portion 1310 of the inner half-shell 130 extends for almost the entire length of the outer half-shell 120, and the second portion 1320 of the inner half-shell 130 extends for a short length at the lower end portion 111 of the lever 110.

The second portion 1320 of the inner half-shell 130 comprises a bottom wall 1322 and two side walls 1324, which join at the bottom, so as to delimit, with the bottom wall 1322, a seat for receiving the power supply source 150 of the luminous indicator means 140.

In this embodiment, the power supply source 150 is preferably housed in its own containment body, separately from the circuit board 160.

The circuit board 160 can be housed in its own containment body, preferably tight, and/or it can be co-moulded with a plastic film that makes it waterproof and protects it from dust.

Thanks to the positioning described above of the luminous indicator means 140, when activated by the cyclist they advantageously act as means for signaling to third parties the presence of the bicycle and/or the intention of the cyclist to change the direction of the bicycle.

In the illustrated embodiment, the luminous indicator means 140 comprise an Organic Light-Emitting Diode (OLED) 144. A cable 143, preferably a flat cable, extends from the OLED 144 for the electrical connection of the luminous indicator means 140 to the power supply source 150, such as for example a button battery 152, and/or for data communication to/from the circuit board 160 for driving the OLED.

Figures 10, 11:
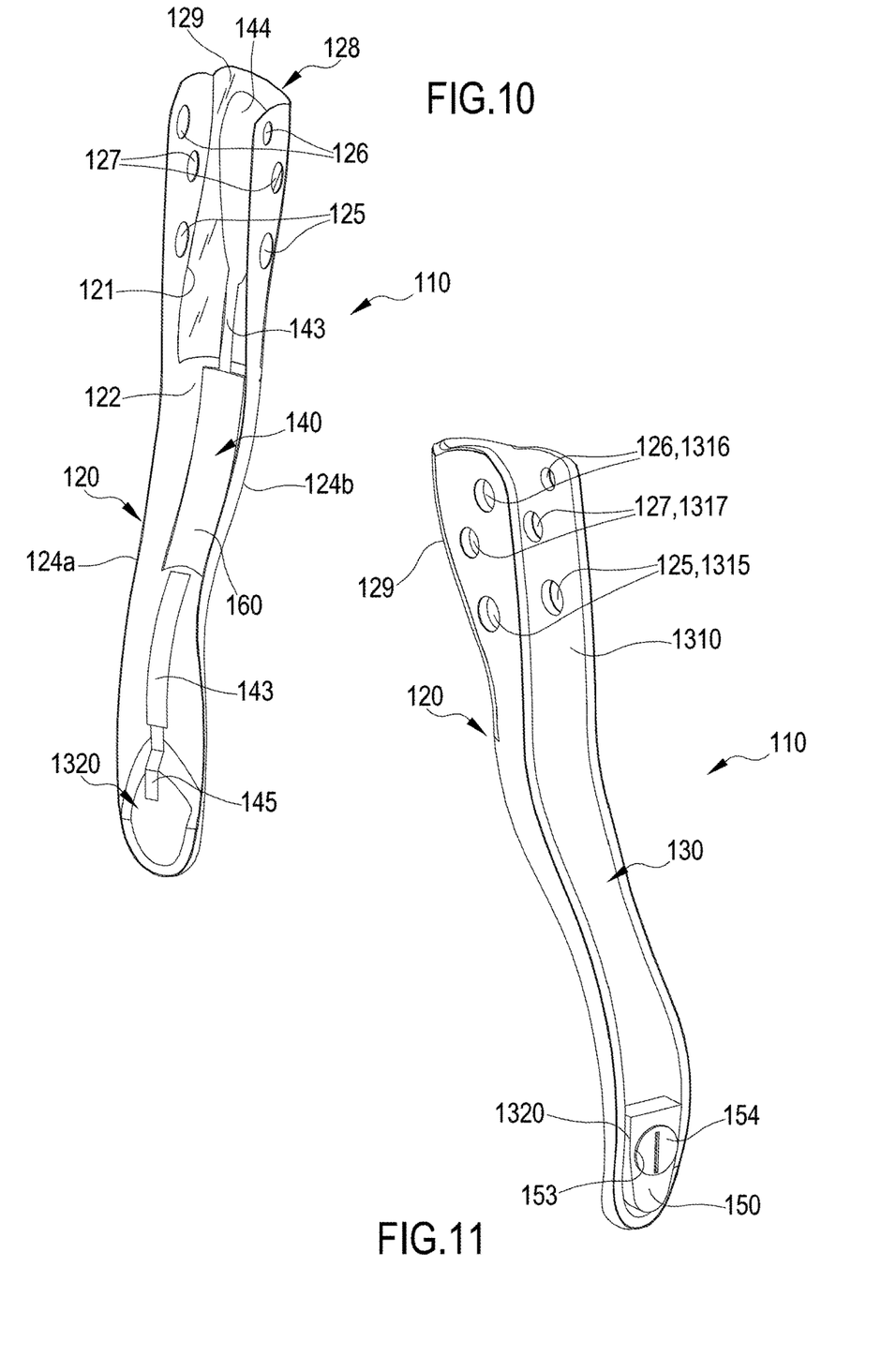
FIG. 10 is a rear perspective view of the control lever of FIG. 8 with some components removed.
FIG. 11 is a rear perspective view of the control lever of FIG. 8.

In particular, and as shown in greater detail in FIG. 10, the power supply cable 143 extends for almost the entire length of the brake lever 110, and has an end section 145 for electrical connection to the power supply source 150, which is housed in the second portion 1320 of the inner half-shell 130. The battery is for example kept in position through a cover 154 suitable for inserting in a suitable seat 153 formed in the power supply source 150.

The circuit board 160 (FIGS. 9, 10) can be in communication with the control electronics of the bicycle to drive the OLED 144 as a function of the variables detected by the control electronics, and/or in conjunction with the switching on of a light indicator of the presence of the bicycle and/or of a head/tail-light of the bicycle.

Alternatively or in addition, the OLED 144 can be driven upon a command by the cyclist, through a suitable switch (not shown).

Still alternatively, it is possible to provide for an ambient light sensor to drive the OLED 144, or furthermore the OLED 144 can be always switched on.

Like for the embodiment of FIGS. 1 to 7, the communication between the circuit board 160 and the control electronics of the bicycle, where provided for, can be of the wireless or wired type. In the first case there will be a transceiver module, while in the second case there will be a suitable conductor with connector.

With reference to FIGS. 10 and 11, the method for manufacturing the brake lever 110 described above with reference to FIGS. 8 and 9 will now be described.

First of all, the outer half-shell 120 of the brake lever 110 is provided and, thereafter, the luminous indicator means 140 are inserted inside it, with emitting surface facing towards the outside (distal side) of the control lever 110. The circuit board 160 is connected to the power supply cable 143.

Once insertion has taken place, the OLED 144 is positioned at the opening 121 formed in the bottom wall 122 of the outer half-shell 120. The opening 121 is then closed by the transparent cover 129, which, as stated, acts as a protective means of the OLED 144 as well as possibly as means for diffusing the light emitted by the OLED 144 itself during the operation of the luminous indicator means 140. Furthermore, the power supply cable 143 extends longitudinally in contact with the bottom wall 122 of the outer half-shell 120.

Then (FIG. 10), the second portion or appendix 1320 of the inner half-shell 130 is associated with the outer half-shell 120 overlapping it.

Thereafter (FIG. 11), the first portion 1310 of the inner half-shell 130 is associated with the outer half-shell 120 overlapping it. After such an operation, the OLED 144, the power supply cable 143, excluding its end portion 145, and the circuit board 160 are arranged between the outer half-shell 120 and the first portion 1310 of the inner half-shell 130, sandwiched between them. In particular, the OLED 144 is sandwiched between the transparent cover 129 and the bottom wall 1312 of the first portion 1310 of the inner half-shell 130.

Moreover, the first portion 1310 and the second portion 1320 of the inner half-shell 130 overlap at the respective overlapping areas 1311 and 1319. Moreover, the luminous indicator means 140 with the power supply/data cable 143 and the circuit board 160 are sandwiched between the outer half-shell 120 and the inner half-shell 130, with the end section 145 of the cable 143 uncovered for the electrical connection of the luminous indicator means 140 with the power supply source 150.

Also in this case, the coupling between the inner half-shell 130 and the outer half-shell 120 preferably takes place by co-moulding or lamination, but the aforementioned alternatives are possible.

The above is a description of various embodiments of inventive aspects, and further changes can be made without departing from the scope of protection of the present invention. The shape and/or size and/or location and/or orientation of the various components and/or the succession of the various steps can be changed. The functions of one element or step can be carried out by two or more components or steps, and vice-versa. Components shown directly connected or in contact can have intermediate structures arranged between them. Steps shown as directly subsequent can have intermediate steps carried out between them. The details shown in a figure and/or described with reference to a figure or to an embodiment can apply in other figures or embodiments. Not all of the details shown in one figure or described in a same context necessarily have to be present in a same embodiment. Features or aspects that turn out to be innovative with respect to the prior art, alone or in combination with other features, should be deemed to be described per se, independently of what has been explicitly described as innovative.

Merely by way of an example, also in the embodiment of FIGS. 1 to 7 there can be a switch between the power supply source and the luminous indicator means.

Moreover, although in the illustrated embodiments it is provided for there to be a plurality of LEDs at the side portion of the control lever and an OLED element at the front portion of the control lever, it is equally possible to provide the opposite positioning of the lighting elements, i.e. an OLED at the side portion of the control lever and LEDs at the front portion of the control lever.

As an alternative to LEDs and OLEDs, it is possible to use a small Liquid Cristal Display (LCD) to provide visual indications for the cyclist.

In order to be visible to the cyclist and/or to third parties, the transparent region and the emission surface of the luminous indicator means could be positioned (also) on the distal side surface of the brake lever.

In the case of levers other than the brake lever, the transparent region and the emission surface of the luminous indicator means will be suitably positioned so as to be visible to the cyclist and/or third parties.

The inner and outer half-shells may not be totally overlapped, it being sufficient for they to overlap at the luminous indicator means, so as to sandwich them.

The first and second portion of the inner half-shell can be assembled in reverse order to what is shown.

From the description that has been made, the features of the control lever and of its manufacturing method, object of the present invention, are manifest, just as the relative advantages are also manifest.

Further variants of the embodiments described above are possible, without departing from the teachings of the invention.

What is claimed is:

1. A bicycle control lever comprising:
    an inner half-shell having a first channel defined by pair of sidewalls and a bottom wall;
    an outer half-shell having a second channel defined by a pair of sidewalls and a bottom wall, the second channel is dimensioned to receive the inner half-shell within the outer half-shell, and the outer half-shell has a transparent region; and
    a luminous indicator that is positioned adjacent to the transparent region of the outer half-shell;
    wherein the inner half-shell is nested and aligned within the outer half-shell such that the pair of sidewalls of the inner half-shell are aligned with and adjacent to the pair of sidewalls of the outer half-shell, and the bottom wall of the inner half-shell is aligned with and adjacent to the bottom wall of the outer half-shell and the luminous indicator is retained between the outer half-shell and the inner half-shell at the transparent region.

2. The control lever according to claim 1, wherein said inner half-shell comprises a first portion and a second portion, which have respective overlapped areas.

3. The control lever according to claim 1, further comprising a connector of said luminous indicator to at least one of a power supply or a driver of the luminous indicator, said connector comprising an end section extending between a portion of the inner half-shell and the outer half-shell and protruding from an overlapped area of both the inner half-shell and the outer half-shell.

4. The control lever according to claim 1, further comprising a driver of the luminous indicator, and a transceiver module for communications between the driver of the luminous indicator and a bicycle's control electronics.

5. The control lever according to claim 1, wherein said transparent region of the outer half-shell is formed as one piece with the rest of the outer half-shell.

6. The control lever according to claim 1, wherein said transparent region of the outer half-shell comprises an opening formed in the outer half-shell, and a cover made of transparent material for closing said opening.

7. The control lever according to claim 1, wherein said transparent region is arranged in a position on the control lever at a proximal side wall of the outer half-shell, wherein the proximal side wall is defined with respect to a center of a bicycle handlebar, in at least one condition selected from an actuation condition of the control lever and a rest condition of the control lever.

8. The control lever according to claim 1, wherein said transparent region is arranged in a position on the control lever that is frontal or distal with respect to a forward travel direction in at least one condition selected from an actuation condition of the control lever and a rest condition of the control lever.

9. The control lever according to claim 1, wherein said luminous indicator comprises a support body and a plurality of lighting elements arranged on the support body.

10. The control lever according to claim 1, wherein said luminous indicator comprises an OLED.

11. The control lever according to claim 1, wherein said outer half-shell and said inner half-shell are made of a composite material comprising a matrix of polymeric material and structural fibers.

12. The bicycle control lever of claim 1, wherein the first channel and the second channel are opened and aligned in a common direction.

13. A method for manufacturing a bicycle control lever comprising the steps of:
    providing (i) an inner half-shell having a first channel defined by pair of sidewalls and a bottom wall, and (ii) an outer half-shell having a second channel defined by a pair of sidewalls and a bottom wall, and a transparent region, the second channel being dimensioned to receive the inner half-shell within the outer half shell;
    inserting a luminous indicator in the outer half-shell at the transparent region of the outer half-shell, and the luminous indicator is positioned adjacent to the transparent region of the outer half-shell; and
    nesting and aligning the inner half-shell within the outer half-shell and irremovably associating the inner half-shell with the outer half-shell at least partially overlapping it to the outer half-shell via co-molding such that the pair of sidewalls of the inner half-shell are aligned with and adjacent to the pair of sidewalls of the outer half-shell, and the bottom wall of the inner half-shell is aligned with and adjacent to the bottom wall of the outer half shell,
    the luminous indicator being at least partially arranged between the outer half-shell and the inner half-shell,
    wherein the outer half-shell and the inner half-shell are each made of a composite material comprising a matrix of polymeric material and structural fibers.

14. The method according to claim 13, wherein said inner half-shell comprises a first portion and a second portion, and said step of associating the inner half-shell with the outer half-shell comprises the steps of:
    associating one of said first portion and said second portion of the inner half-shell with the outer half-shell so that the luminous indicator is at least partially arranged between said inner half-shell and said outer half-shell; and
    associating the other of said first portion and said second portion of the inner half-shell with the outer half-shell, so that said first portion and said second portion have respective overlapping areas and so that an end section of a connector of said luminous indicator to at least one of a power supply or a driver of the luminous indicator extends between and protrudes from said overlapping areas of both the inner half-shell and the outer half-shell.

* * * * *